United States Patent [19]
Holender et al.

[11] Patent Number: 6,069,894
[45] Date of Patent: May 30, 2000

[54] ENHANCEMENT OF NETWORK OPERATION AND PERFORMANCE

[75] Inventors: Wlodek Holender, deceased, late of Lund, Sweden, by Kerstin Korning, legal representative, David Holender, heir; Tamas Henk, Budapest, Hungary; Soren Blaabjerg, Allerod, Denmark; András Faragó, Budapest, Hungary; Bengt Stavenow, Lund, Sweden

[73] Assignee: Telefonaktiebolaget LM Ericsson, Stockholm, Sweden

[21] Appl. No.: 08/765,106

[22] PCT Filed: Jun. 12, 1995

[86] PCT No.: PCT/SE95/00704

§ 371 Date: Apr. 21, 1997

§ 102(e) Date: Apr. 21, 1997

[87] PCT Pub. No.: WO95/34981

PCT Pub. Date: Dec. 21, 1995

[51] Int. Cl.[7] .................................................. H04Q 11/04
[52] U.S. Cl. ........................ 370/397; 370/399; 370/409; 370/468
[58] Field of Search .................................. 370/232, 248, 370/252, 253, 338, 347, 388, 397, 400, 409, 465, 468, 399, 396

[56] References Cited

U.S. PATENT DOCUMENTS

| | | | |
|---|---|---|---|
| 4,744,028 | 5/1988 | Karmarkar | 364/402 |
| 4,763,319 | 8/1988 | Rozenblit | 370/397 |
| 5,166,927 | 11/1992 | Iida et al. | 370/238 |
| 5,854,903 | 12/1998 | Morrison et al. | 370/388 |

FOREIGN PATENT DOCUMENTS

| | | | |
|---|---|---|---|
| 0631 413 A2 | 12/1994 | European Pat. Off. | H04L 12/56 |

OTHER PUBLICATIONS

A. Hiramatsu, "Integration of ATM Call Admission Control and Link Capacity Control by Distributed Neural Networks," *IEEE Journal on Selected Areas in Communications*, vol. 9, No. 7 (1991).

G. Gopal et al., "Algorithms for reconfigurable networks," Teletraffic and Datatraffic in a period of change, ITC 13 (1991).

F.P. Kelly, "Routing and Capacity Allocation in Networks with Trunk Reservation," *Mathematics of Operations Research*, vol. 15, No. 4(1990).

F.P. Kelly, "Fixed Point Models of Loss Networks" in *J. Austral. Math. Soc. Ser. B31* (1989) pp. 204–218.

A. Farago et al., *Resource Separation—An Efficient Tool for Optimizing ATM Network Configuration*, Networks '94 (Sep. 1994).

(List continued on next page.)

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

A set of logical networks is established on top of a physical network Next, a predefined objective function, closely related to the operation and performance of the physical network, which physical network is viewed as the set of logical networks, is optimized with respect to at least one set of decision variables. Finally, the decision variables in accordance with the optimization are used to control the operation of the overall network system. Physical transmission resources are partitioned among logical networks. Traffic loads are distributed among routes interconnecting the nodes of node pairs.

45 Claims, 10 Drawing Sheets

OTHER PUBLICATIONS

Labourdette et al., *Blocking Probabilities in Multitraffic Loss Systems: Insensitivity Asymptotic Behavior and Approximations,* IEEE Trans. Communications, vol. 40, pp. 1355–1366 (Aug. 1992).

G. Gopal et al., "Dynamic Network Configuration Management," IEEE International Conference on Communications, vol. 2 (Apr. 1990).

T. Hadnong, B. Stavenow, J. Dejean "Stratified Reference Model An Open Architecture Approach for B–ISDN" ISS 1990.

Patent Abstracts of Japan, vol. 17, No. 652 (E–1466), Abstract of JP–A–5– 207068 (Aug. 13, 1993).

ENHANCEMENT OF NETWORK OPERATION AND PERFORMANCE

TECHNICAL FIELD OF THE INVENTION

The present invention relates to telecommunication networks and in particular to overall network performance.

BACKGROUND ART

A main characteristic of a modern telecommunication network is its ability to provide different services. One efficient way of providing said services is to logically separate the resources of a physical network—resource separation (see FIG. 1). On top of a physical network PN there is established a number of logical networks LN, also referred to as logical or virtual subnetworks, each of which comprises nodes N and logical links LL interconnecting the nodes. Each logical network forms a logical view of parts of the physical network or of the complete physical network. In particular, a first logical network LN1 comprises one view of parts of the physical network and a second logical network LN2 comprises another view, different from that of the first logical network. The logical links of the various logical networks share the capacities of physical links present in said physical network.

A physical network comprises switches S (physical nodes) or equivalents, physical links interconnecting said switches, and various auxiliary devices. A physical link utilizes transmission equipment, such as fiber optic conductors, coaxial cables or radio links. In general, physical links are grouped into trunk groups TG which extend between said switches. There are access points to the physical network, to which access points access units, such as telephone sets and computer modems, are connected. Each physical link has limited transmission capacity.

FIG. 2 is a simple schematic drawing explaining the relationship between physical links, logical links and also routes. A simple underlying physical network with physical switches S and trunk groups TG, i.e. physical links, interconnecting the switches is illustrated. On top of this physical network a number of logical networks are established, only one of which is shown in the drawing. The logical networks can be established by a network manager, a network operator or other organization. In our Swedish Patent Application 9403035-0, incorporated herein by reference, there is described a method of creating and configuring logical networks. The single logical network shown comprises logical nodes N1, N2, N3 corresponding to physical switches S1, S2 and S3 respectively. Further, the logical network comprises logical links LL interconnecting the logical nodes N1–N3. A physical link is logically subdivided into one or more logical links, each logical link having an individual traffic capacity referred to as logical link capacity. It is important to note that each logical link may use more than one physical link or trunk group. To each node in each logical network there is usually associated a routing table, which is used to route a connection from node to node in the particular logical network starting from the node associated with the terminal that originates the connection and ending at the node associated with the terminal which terminates said connection. Said nodes together form an origin-destination pair. A node pair with two routes is also illustrated. One of the routes is a direct route DR while the other one is an alternative route AR. In the figures, the links and the routes may be interpreted as being bidirectional.

In order to avoid misconceptions the following definitions will be used: A route is a subset of logical links which belong to the same logical network, i e. a route have to live in a single logical network. Note that it can be an arbitrary subset that Is not necessarily a path in the graph theoretic sense. Nevertheless, for practical purposes, routes are typically conceived as simple paths. The conception of a route is used to define the way a connection follows between nodes in a logical network. A node pair in a logical network, the nodes of which are associated with access points, is called an origin-destination (O-D) pair. In general, all node pairs in a logical network are not O-D pairs, but instead some nodes in a logical network may be intermediate nodes to which no access points are associated. A logical link is a subset of physical links.

Information, such as voice, video and data, is transported In logical networks by means of different bearer services. Examples of bearer services are STM 64 (Synchronous Transmission Mode with standard 64 kbit/s), STM 2 Mb (Synchronous Transmission Mode with 2 Mbit/s) and ATM (Asynchronous Transfer Mode). From a service network, such as PSTN (Public Switched Telephone Network) and B-ISDN (Broadband Integrated Services Digital Network) a request is sent to a logical network that a connection should be set up in the corresponding logical network.

Although the physical network is given, it is necessary to decide how to establish logical networks on top of the physical network and how to distribute or partition said physical network resources among logical networks by subdividing physical link capacities into logical link capacities associated with said logical networks. Since the logical networks share the same given physical capacities, there is a trade-off between their quality: GoS (Grade of Service) parameters, call blocking probabilities etc. can be improved in one of the logical networks only at the price of degrading the quality in other logical networks. It is a highly non-trivial task to find the partitioning of resources so as to optimize the overall network performance, in particular when considering a large and complex network. Furthermore, the network performance is also affected by the distribution of offered traffic load among the routes which can realize communication even within a single network. It is the management and dimensioning of a resource separated network to which the present invention is directed.

RELATED TECHNIQUE

A method for adaptive link capacity control, and the integration of call admission control and link capacity control, by using distributed neural networks is disclosed in the article entitled "Integration of ATM Call Admission Control and Link Capacity Control by Distributed Neural Networks" by A. Hiramatsu in IEEE Journal on Selected Areas in Communications, vol. 9, no. 7 (1991). At first neural networks are trained to estimate the call loss rate given the link capacity and observed traffic. Next, an objective function of the link capacity assignment optimization problem, constituted by the maximum call loss rate in the network, is optimized by a simple random optimization method according to the estimated call loss rate.

The method of Hiramatsu only considers the optimization problem on the level of logical links. The concept of logical networks is not at all incorporated in the approach of Hiramatsu. Besides, the optimization method, the Matyas random optimization method, is a simple method generally leading to a suboptimal solution. Also, only one bit-rate class is considered in the model.

The article "Algorithms for reconfigurable networks" in Teletraffic and Datatraffic in a period of change, ITC 13

(1991) by G. Gopal et al. relates to an optimal logical network design method for a reconfigurable network, i.e. a network which can change between logical networks. The weighted blocking averaged over all source-destination pairs, is minimized by a simple heuristic algorithm. Subsequently, the logical network is reconfigured according to this minimization.

According to the method of Gopal et al. there exists a number of possible logical network configurations. However, only one logical network can be used in a certain traffic situation. This single logical network can be reconfigured in accordance with the heuristic minimization algorithm. Furthermore, the configuration of the single logical network is not at all based on e.g. traffic types, but is instead closely related to the given physical network. Besides, Gopal uses a very simple estimation of route blocking which is adequate only for small networks. Moreover, in the method of Gopal et al. the problem is formulated as a non-linear integer problem and due to this fact the results are in general suboptimal.

In the article "Routing and Capacity Allocation in Networks with Trunk Reservation" in Mathematics of Operations Research, vol. 15., no. 4, (1990) by F. P. Kelly the derivatives of an implicitly defined revenue function are calculated. The use of these derivatives in the management of a single service network carrying single rate traffic with the emphasis on trunk reservation is suggested.

In the U.S. Pat. No. 4,744,028 a method and apparatus for optimizing resource allocation is disclosed. More specifically, a linear programming approach is described which proceeds in the interior of a polytope solution space. Each successive approximation of the solution point, and the polytope, is normalized such that the solution point is at the center of the normalized polytope. The objective function of the linear programming model is then projected into the normalized space and the next step is taken in the direction of the steepest decent of the objective function gradient and such as to remain within the interior of the polytope. The process is repeated until the optimum solution is closely approximated.

The method described in the above U.S. Patent assumes that the resource allocation problem can be adequately described by a linear programming model. In its application to resource allocation, such a model consists of a number of linear expressions representing the quantitative relationships between the various possible allocations, their constraints and their costs, i.e. the objective function is a linear function of the allocated resources. Moreover, the method according to the above U.S. patent does not take teletraffic models, such as e.g. Erlang's B formula, describing the statistical fluctuation of traffic, into consideration. Consequently, the linear programming model described in the above U.S. patent is quite unsatisfactory. The partitioning problem that the present invention considers gives rise to an objective function that depends on the allocated resources in an indirectly defined non-linear way. The dependence is defined through a complicated non-linear system of equations that follows from a teletraffic model.

SUMMARY OF THE INVENTION

On top of a physical network a number of logical networks are established in which logical links, used by routes, share the same physical transmission and switching resources. There are several reasons for logically separating physical resources. Logical resource separation for offering different Grade of Service classes, virtual leased networks with guaranteed resources and peak rate allocated virtual paths are some examples of interesting features in the design, dimensioning and management of physical networks. However, it is still necessary to decide how to distribute or partition said physical network resources among the logical networks. In addition, the distribution of offered traffic load among routes interconnecting the nodes of node pairs in the logical networks will also affect the overall network performance.

In accordance with the present invention a set of logical networks is established on top of a physical network, which physical network comprises physical transmission and switching resources. The logical networks comprise nodes and logical links extending between the nodes so as to form the logical networks. The logical links are used by routes interconnecting the nodes of node pairs in the logical networks. Next, in accordance with a main aspect of the present Invention, an objective function which is closely related to the operation and overall performance of the resource separated physical network is optimized with respect to at least one set of decision variables, given physical network parameters and the requirements of each logical network. Examples of objective functions are the carried traffic in the complete network, the link utilization and the network revenue or some other function representing resource utilization or network performance. Two sets of decision variables are the logical link capacities, and the load sharing variables controlling the distribution of offered traffic load among routes.

Each set of decision variables is related to a separate aspect of the invention. If the objective function have been optimized with respect to the logical link capacities then the physical transmission resources of the physical network are allocated among the logical links of the various logical networks in accordance with the optimization. On the other hand, if the objective function have been optimized with respect to the load sharing variables, then the offered traffic load is distributed, for each individual node pair in each one of the logical networks, among the routes interconnecting the nodes of the individual node pair, in accordance with the optimization.

Furthermore, optimizing with respect to both the logical link capacities and the load sharing variables relates to yet another aspect of the present invention. In this particular case, the physical transmission resources of the physical network are allocated among the logical links of the various logical networks and the offered traffic load is distributed, for each individual node pair in each one of the logical networks, among the routes interconnecting the nodes of the individual node pair, in accordance with the optimization.

In accordance with a first aspect of the present invention there is provided a method and device for partitioning physical transmission resources among logical networks.

In accordance with a second aspect of the present invention there is provided a method and device for distributing offered traffic load among routes interconnecting the nodes of node pairs.

In accordance with a third aspect of the present invention there is provided a method and device for partitioning said physical transmission resources among logical networks and distributing offered traffic load among routes interconnecting the nodes of node pairs.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiments which follows, when read in conjunction with the accompanying drawings, wherein:

PREFERRED EMBODIMENTS OF THE INVENTION

An important tool in network management, particularly the management and dimensioning of large ATM networks, is the distribution of resources of a physical network among logical networks that share the capacity of the physical network. There are several advantages of logical resource separation:

It has gradually been recognized in the last couple of years that it is not at all easy to integrate services with very different demands to e.g. bandwidth, grade of service or congestion control functions. In some cases it turn out to be better to support different services by offering separate logical networks, and limiting the degree of integration to only partial rather than complete sharing of physical transmission and switching resources. Network management can be simplified if service classes are arranged into groups in such a way that only those of similar properties are handled together in a logical network. For example, delay sensitive and loss sensitive service classes can possibly be managed and switched easier if the two groups are handled separately in different logical subnetworks, rather than all mixed on a complete sharing basis.

Moreover, in this way they can be safely handled on call level without going down to cell level as e.g. in priority queues. Of course, within a logical network statistical multiplexing, priority queuing and other mechanisms can still be applied among service classes that already have not too different characteristics;

Important structures such as virtual leased networks, required by large business users, and virtual LAN's are much easier to implement;

A Virtual Path (VP), a standardized element of ATM network architecture, can be considered as a special logical network;

The physical network operates more safely.

Figure 1:
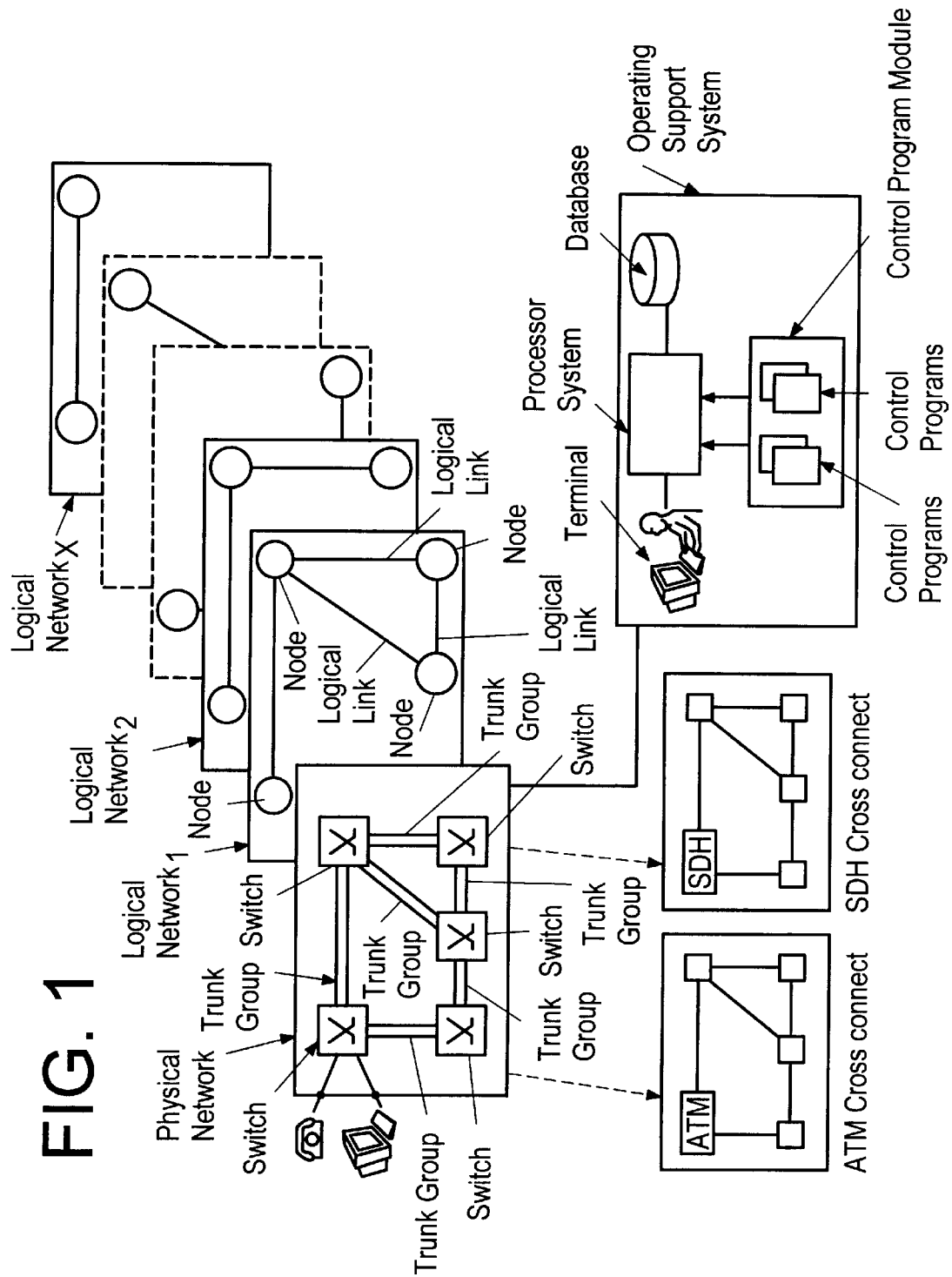
FIG. 1 shows a physical network, on top of which a number of logical networks are established, and an operation and support system (OSS) which controls the operation of the overall network.
Figure 2:
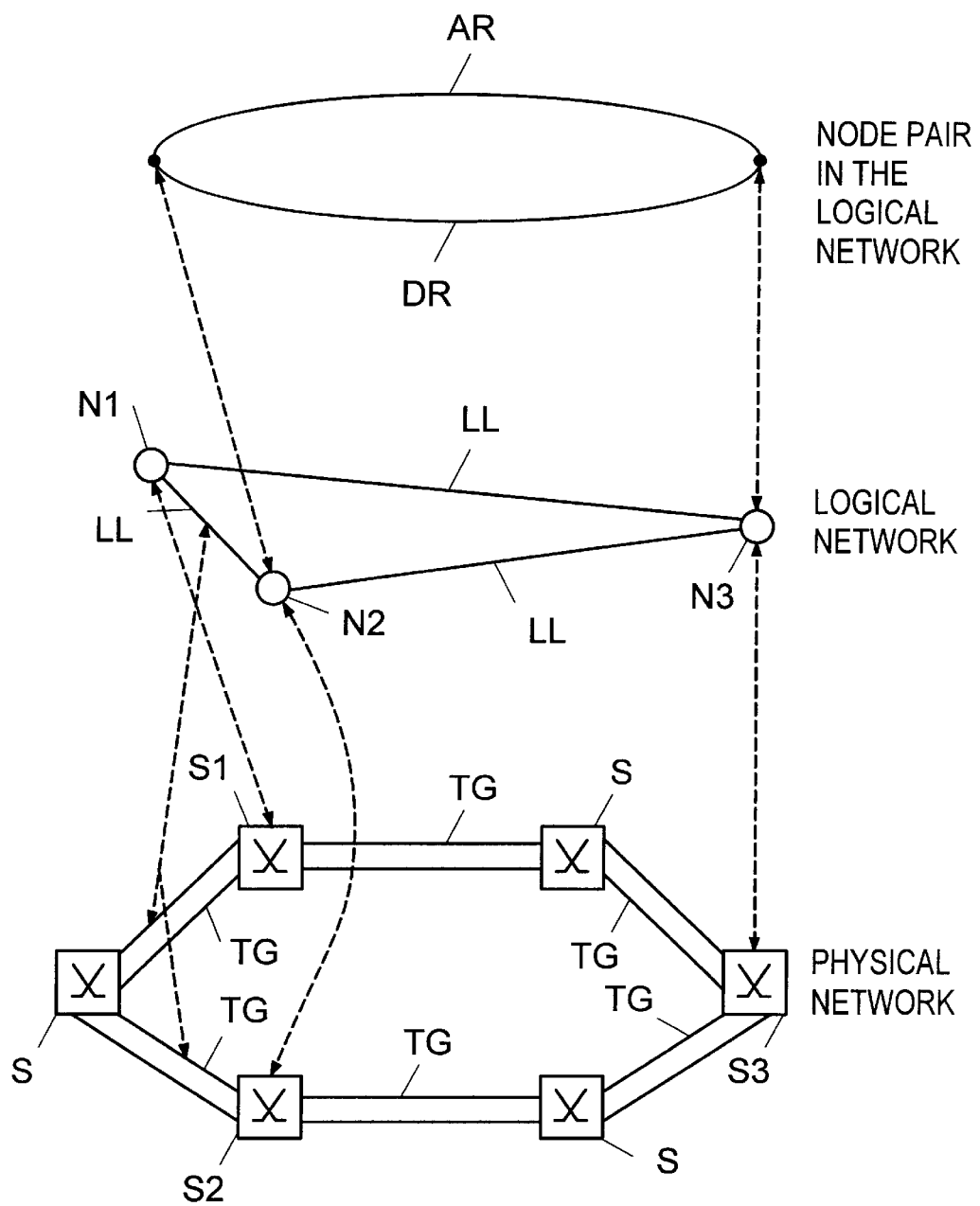
FIG. 2 is a schematic drawing explaining the relationship between physical links and switches, logical links and nodes, and also routes.

A physical network, e.g. a large telecommunication network, with physical resources is considered. In FIG. 1 there is illustrated a physical network PN on top of which a set of logical networks LN1, LN2, . . . , LNX (assuming there are X logical networks) is established. Each logical network comprises nodes N and logical links LL interconnecting the nodes. The topology of these logical or virtual networks will in general differ from the topology of the underlying physical network.

The network system is preferably controlled by an operation and support system OSS. An operation and support system OSS usually comprises a processor system PS, terminals T and a control program module CPM with a number of control programs CP along with other auxiliary devices. The architecture of the processor system is usually that of a multiprocessor system with several processors working in parallel. It is also possible to use a hierarchical processor structure with a number of regional processors and a central processor. In addition, the switches themselves can be equipped with their own processor units in a not completely distributed system, where the control of certain functions are centralized. Alternatively, the processor system may consist of a single processor, often a large capacity processor. Moreover, a database DB, preferably an interactive database, comprising e.g. a description of the physical network, traffic information and other useful data about the telecommunication system, is connected to the OSS. Special data links, through which a network manager/operator controls the switches, connect the OSS with those switches which form part of the network system. The OSS contains e.g. functions for monitoring and controlling the physical network and the traffic.

From this operation and support system OSS the network manager establishes a number of logical networks on top of the physical network by associating different parts of the traffic with different parts of the transmission and switching resources of the physical network. This can e.g. be realized by controlling the port assignment of the switches and cross connect devices of the physical network, or by call admission control procedures. The process of establishing logical networks means that the topology of each one of the logical networks is defined. In other words, the structure of the nodes and logical links in each logical network is determined.

Conveniently, traffic classes are arranged into groups in such a way that those with similar demands to bandwidth are handled together in a separate logical network. By way of example, all traffic types requiring more than a given amount of bandwidth can be integrated in one logical network, and those traffic types that require less bandwidth than this given amount can be integrated in another logical network. In other words, the two traffic groups are handled separately in different logical subnetworks. In particular, this is advantageous for an ATM network carrying a wide variety of traffic types. However, in one embodiment of the present invention, each individual traffic type is handled in a separate logical network.

Figure 3:
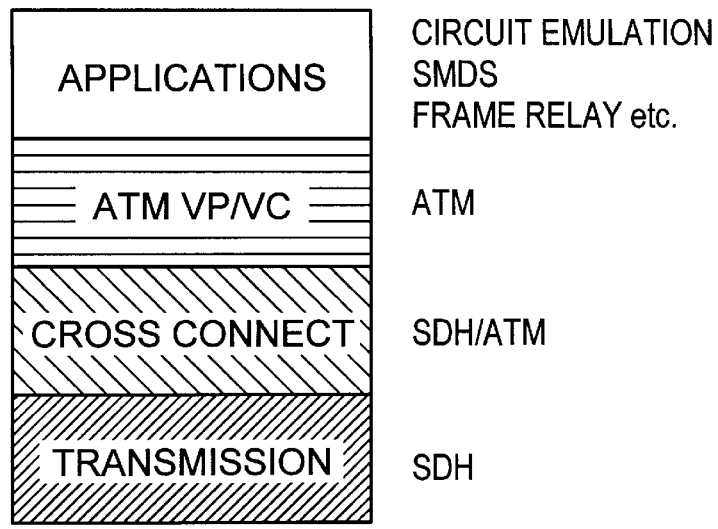
FIG. 3 is a schematic drawing of a B-ISDN network from the viewpoint of the Stratified Reference Model.
Figure 3:
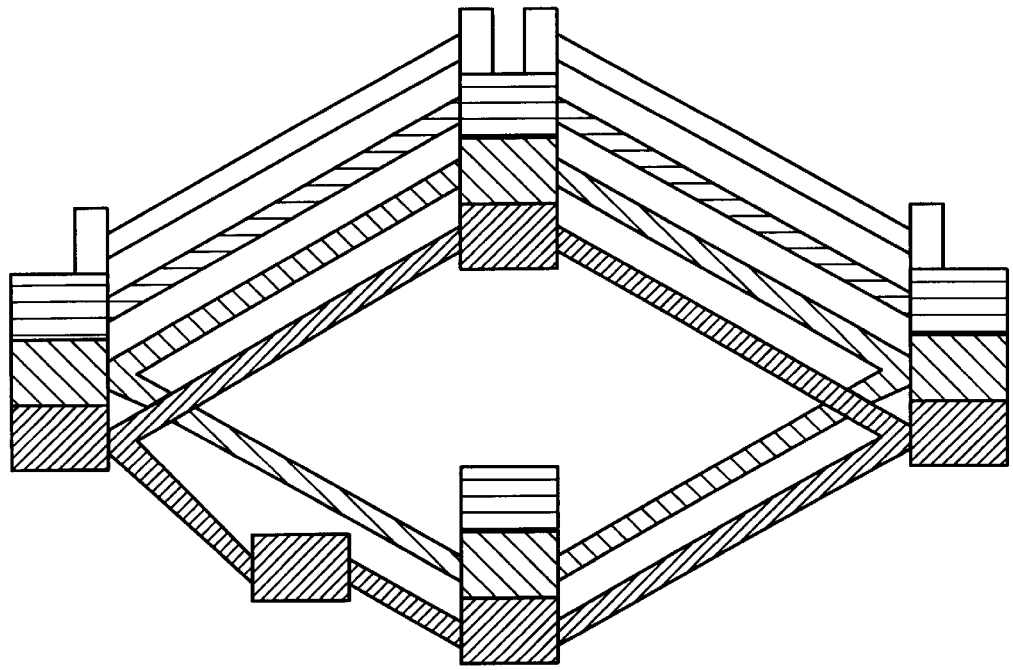

Preferably, the present invention is applied in the B-ISDN (Broadband Integrated Services Digital Network) environment. A fully developed B-ISDN network will have a very complex structure with a number of overlaid networks. One conceptual model suitable of describing overlaid networks is the Stratified Reference Model as described in "The stratified Reference Model: An Open Architecture to B-ISDN" by T. Hadoung, B. Stavenow, J. Dejean, ISS'90, Stockholm. In FIG. 3 a schematic drawing of a B-ISDN network from the viewpoint of the Stratified Reference Model is illustrated (the protocol viewpoint to the left and the network viewpoint to the right). Accordingly, the B-ISDN will consist of the following strata. A transmission stratum based on SDH (Synchronous Digital Hierarchy) or equivalent (SONET) at the bottom, a cross connect stratum based on either SDH or ATM (Asynchronous Transfer Mode) on top of that, which acts as an infrastructure for the ATM VP/VC stratum with switched connections. Finally, the large set of possible applications uses the cross connect stratum as an infrastructure. In one particular embodiment of the present invention it is the infrastructure network modelling the cross connect stratum in a B-ISDN overlaid network that is considered. In general, this infrastructure network is referred to as a physical network.

Of course, it is to be understood that the present invention can be applied to any physical telecommunication network.

Figure 4:
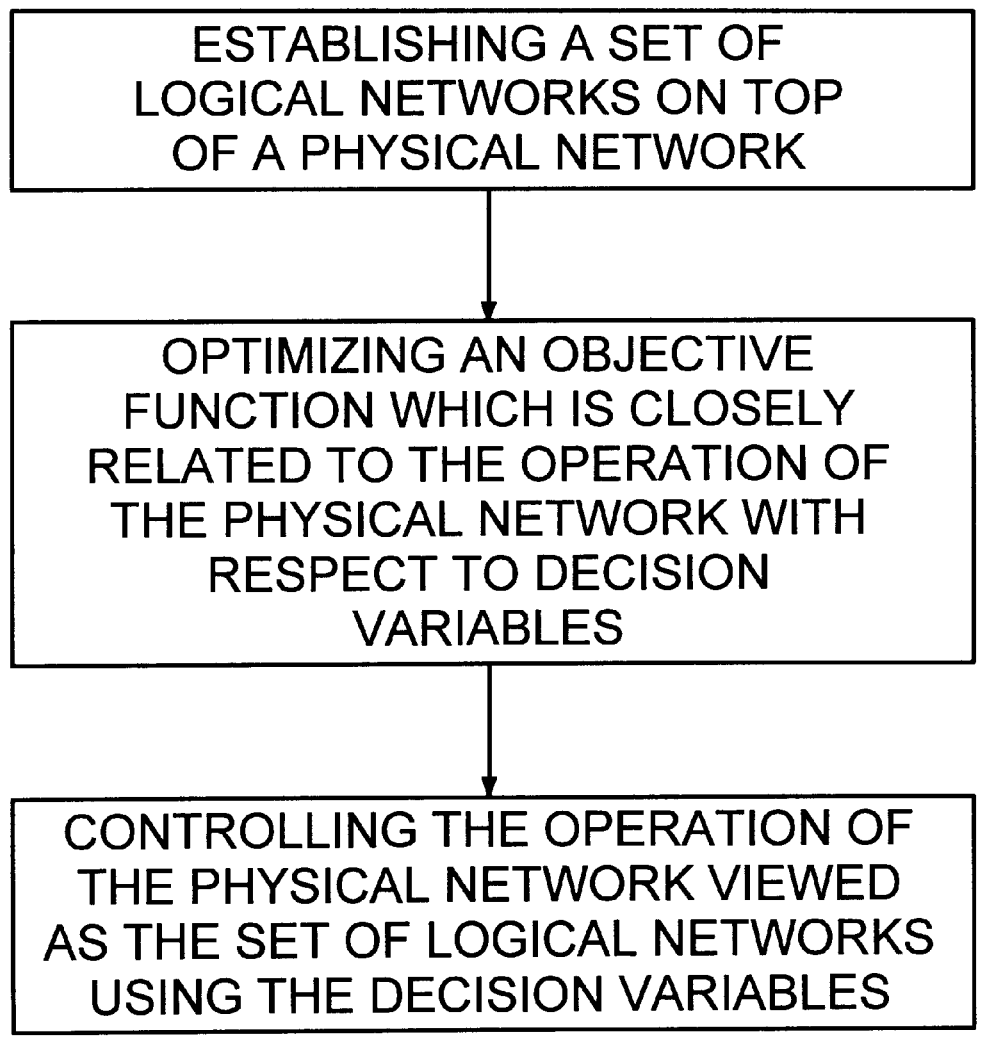
FIG. 4 is a schematic flow diagram illustrating a method in accordance with a general inventive concept of the present invention.

FIG. 4 shows a schematic flow diagram illustrating a method in accordance with a general inventive concept of the present invention. In accordance with the present invention a set of logical networks is established on top of a physical network comprising physical transmission and switching resources, said logical networks comprising nodes and logical links extending between the nodes so as to define the topology of said logical networks. Preferably, the logical networks are completely separated from each other. The logical links are used by routes interconnecting the nodes of node pairs in the logical networks. Next, a predefined objective function, closely related to the operation and performance of the physical network, which physical network is viewed as the set of logical networks, is optimized with respect to decision variables. Finally, the decision variables in accordance with the optimization are used to control the operation of the overall network system.

The physical transmission resources, i.e. the transmission capacities of the physical links, have to be partitioned or distributed among the logical links of said logical networks in some way. In this context, a natural objective is to partition the physical transmission resources so as to optimize the operation of the complete physical network, viewed as the set of logical networks, according to a given predefined objective function.

It is important to note that the logical networks share the same given physical transmission and switching resources, which means that the operation of the physical network has to be optimized with respect to all the logical networks, i.e. the complete set of logical networks, at the same time.

As indicated in FIG. 3 the cross connect stratum can be realized by either SDH or ATM. If the cross connect stratum is based on SDH and the infrastructure network is realizing e.g. different quality of service classes by resource separation, the partitioning can only be performed in integer portions of the STM modules of the SDH structure. On the other hand, if the cross connect is realized by ATM virtual paths then no integrality restriction exists and the partitioning can be performed in any real portions. Therefore, whether the cross connect stratum is based on SDH or ATM will have important implications for the partitioning of the physical network resources. The SDH cross connect solution gives rise to a model that is discrete with regard to the logical link capacities, while the ATM cross connect solution gives rise to a continuous model. The continuous model requires that the ATM switches support partitioning on the individual input and output ports. For example, this is realized by multiple logical buffers at the output ports. In a preferred embodiment of the invention an infrastructure network modelling the ATM cross connect stratum is considered while in an alternative embodiment an infrastructure modelling the SDH cross connect is considered, as can be seen in FIG. 1.

At the first glance it might appear that partitioning, as opposed to complete sharing, is a reduction of the full flexibility of ATM. This is however not the case if the partitioning is considered on a general level. On a conceptual level the complete sharing schemes, e.g. priority queuing, Virtual Spacing etc. tell us how to realize resource sharing on the cell level, while the partitioning approach seeks for the call scale characteristics, e.g. how to assign rates to various logical links, that is then to be realized on the cell level. In this sense the complete partitioning approach complements, rather than excludes, the complete sharing approaches.

In accordance with a preferred embodiment of the present invention, it is considered as a reasonable goal to achieve maximum carried traffic in the complete physical network. The advantages of using this quantity is that it is well expressed in analytical form and also closely related to the practical aspects of network operation. Therefore, the objective function according to the present invention is preferably defined as the total carried traffic, although other objective functions can be used. Examples of other objective functions are the link utilization in the complete network, the network revenue or some other function representing resource utilization or network performance.

In other words, the optimization associated with resource partitioning is to calculate, given a description of the physical network, the topology of the logical networks, the traffic types, the routes in each of the logical networks and also the offered traffic to each route or to each node pair in each logical network, the logical link capacities for the corresponding logical networks so as to maximize the total carried traffic or the network revenue.

Mathematical Framework

Consider a fixed physical network with N nodes and K physical links, on top of which a number of logically separated logical networks are established. If the total number of logical links over all logical networks is denoted by J, and the capacity of an individual logical link j is denoted $C_j$, then the vector of logical link capacities over all logical networks can be written as $C=(C_1, C_2, \ldots, C_J)$. These logical link capacities are not known in advance. In fact it is desired to optimize them.

The incidence of physical and logical links is expressed by a K×J matrix S in which the J:th entry in the k:th row is equal to 1 if logical link j needs capacity on the k:th physical link, otherwise said entry is 0. Naturally, the sum of logical link capacities on the same physical link cannot exceed the capacity of the physical link. This physical constraint can be expressed as $$SC \leq C_{phys},$$

where C is defined above, and $C_{phys}$ refer to the vector of given physical link capacities. In addition it is required that C24 0.

Assume that I traffic types are carried in the complete network. The role of these traffic types is primarily to handle different bandwidth requirements, but traffic types can be distinguished also with respect to different holding times or even priorities (trunk reservation). By convention, each route carries only a single type of traffic. This means that if several traffic types are to be carried, they are represented by parallel routes. In what follows, $\upsilon$ denotes logical networks, p denotes node pairs (O-D pairs) and i (sometimes also g) denotes traffic types.

The incidence of routes, logical links and traffic types is expressed by the variables $A_{ijr}$ which are equal to 1 when route r uses logical link J and carries traffic type i, otherwise said variables are 0. $A_{ijr}$ is not to be interpreted as the amount of bandwidth that route r requires on logical link J. For that purpose other variables are used: $a_{ij}$ will denote the amount of bandwidth (capacity) that a call belonging to traffic type i requires on logical link j. By this notation it is implicitly assumed that all routes that carry a given traffic type i require the same amount of bandwidth on link j. Since the bandwidth requirement is associated with the traffic type, this is not seen as a restriction. On the other hand, the bandwidth requirement of calls on a given route is allowed to vary along the logical links of the route. In fact, this is needed if the concept of effective or equivalent bandwidth is adopted and the involved logical links have different capacities.

A number of fixed routes in each one of the logical networks is assumed given in advance. Let R be the total set of routes over all logical networks, that is, $$R = \bigcup_\upsilon \bigcup_p \bigcup_i R^{(\upsilon,p,i)} \qquad (1)$$

where $R^{(\upsilon,p,i)}$ is the set of routes in logical network $\upsilon$ realizing communication between node pair p regarding traffic type i. It is important to understand that a route is not associated with more than one logical network. Each logical network is assumed to operate under fixed non-alternate routing.

Let $\kappa_r$ be the Poissonian call arrival rate to route r, let $1/\mu_r$ be the average holding time of calls on route r and let $\nu_r = \kappa_r/\mu_r$ be the offered traffic to route r. Let $\nu_{(\upsilon,p,i)}$ be the aggregated offered traffic of type i to node pair p in logical network v. In a preferred embodiment the offered traffic for each route in each logical network is given while in another preferred embodiment of the invention the above aggregated offered traffic is given for all logical networks, node pairs and traffic types. In the latter case, the load is e.g. distributed on shortest paths.

Optimization Model

In order to speak about optimality in a well-defined sense it is necessary to define a reasonable objective function. A natural and well motivated choice is the total carried traffic or the network revenue due to their tractability and the obvious practical importance. Let $w_r$ be the revenue coefficient parameter for route r, meaning that one unit of carried traffic on route r is associated with revenue $w_r$. The revenue coefficients can easily be incorporated into the total carried traffic function so as to obtain the network revenue function. In the hereinafter described embodiments of the invention we will consider the network revenue as the objective function. However, it should be understood by those skilled in the art that from the technical point of view the total carried traffic is the main objective function and the network revenue is an extension which is a weighted version of the total carried traffic.

On the basis of this mathematical framework the objective function according to a preferred embodiment of the invention can be expressed as the total network revenue summed up over all routes in all the logical networks:

$$W = \sum_{\upsilon,p,i} \sum_{r \in R^{(\upsilon,p,i)}} W_r \nu_r (1 - L_r) \qquad (2)$$

where $L_r$ is the end-to-end blocking probability for traffic on route r. Clearly, this route blocking probability is defined as the probability of the event that at least one logical link is blocked along the route. The objective function to be optimized is inherently difficult to deal with, since it requires knowledge of the carried traffic and thereby route blocking probabilities which can only be computed in an exact way for very small networks. The objective function depends on the allocated resources in an indirectly defined non-linear way. The dependence is defined through a complicated non-linear system of equations that follows from a teletraffic model, as will be described below.

The objective of the optimization task associated with the partitioning of physical network resources is to maximize the total network revenue, as defined above, subject to the physical constraints $SC \leq C_{phys}$, $C \geq 0$. In accordance with a first preferred embodiment of the present invention, this is achieved by computing the partial derivatives of the network revenue with respect to the logical link capacities and subsequently using them in a gradient method.

To be able to obtain analytical results the well known reduced load and link independence assumption is applied, which yields the following fixed point equations, taking different traffic classes into account:

$$B_{ik} = E_{ik}(\rho_{1k}, \ldots, \rho_{Ik}, C_k) \qquad (3)$$

$$\rho_{ik} = (1 - B_{ik})^{-1} \sum_r \lambda_r A_{ikr} a_{ik} \qquad (4)$$

for all i and k, where $$\lambda_r = \nu_r(1 - L_r) \qquad (5)$$

and $$(1 - L_r) = \prod_{i,j} (1 - B_{ij})^{A_{ijr}} \qquad (6)$$

for all i and j. $B_{ik}$ denotes the blocking probability for traffic type i on logical link k. Let $\rho_{ik}$ be the offered bandwidth demand from traffic type i to logical link k when blocking elsewhere is taken into account. For each logical link k and traffic type i it is assumed that there exists a blocking function $E_{ik}$ which, given the logical link offered classwise bandwidth demand $\rho_{1k}, \ldots, \rho_{Ik}$ and logical link capacity $C_k$, returns the blocking probability on logical link k regarding traffic type i. In order to preserve generality any blocking function is allowed that is jointly smooth in all the variables.

Based on this assumption the partial derivatives of the total network revenue can be found in a tractable form suitable for a gradient based hill climbing.

The basic idea of finding the partial derivatives of the network revenue at the point (v, C), where $v = (v_1, v_2, \ldots, v_R)$, can be formulated as follows:

Work on the smooth surface defined by the fixed point equations in a neighborhood of (v, C).

Define appropriate one-dimensional smooth curves and apply the fact that the directional derivative of a differentiable multivariable function in the direction of the tangent of such a curve is equal to the derivative of the function seen as a function of the single variable parametrising the curve.

The partial derivatives of the total network revenue are calculated for the multirate case, as calls on different routes are allowed to have different bandwidth requirements. The formulas are presented in the following and it is useful to have the usual notion of a differential like dW as a small change in W.

The revenue derivative with respect to logical link capacity $C_k$ can be formulated as:

$$\frac{\partial W}{\partial C_k} = \sum_h \zeta_{hk} \sum_r A_{hkr} \lambda_r \left( W_r - \sum_{j \neq k} \sum_g A_{gjr} a_{gj} c_{gj} \right) \quad (7)$$

where $$\zeta_{hk} = -(1 - B_{hk})^{-1} \frac{\partial E_{hk}}{\partial C_k} \quad (8)$$

and where the set of auxiliary parameters $c_{ik}$ is defined by the following system of linear equations:

$$c_{ik} = \sum_h \xi_{hik} \sum_r A_{hkr} \lambda_r \left( W_r - \sum_{j \neq k} \sum_g A_{gjr} a_{gj} c_{gj} \right) \quad (9)$$

where $$\xi_{hik} = (1 - B_{hk})^{-1} \frac{\partial E_{hk}}{\partial \rho_{ik}} (1 - B_{ik})^{-1}. \quad (10)$$

Two important terms in the expression for the revenue derivatives are the partial derivatives of the link blocking function:

$$\frac{\partial E_{hk}}{\partial \rho_{ik}}, \frac{\partial E_{hk}}{\partial C_k}.$$

In the simplest case with Poisson input and homogeneous traffic, the blocking function is Erlang's B formula that is defined for integer capacity values but has a simple analytic extension to any non-negative real capacity value.

However, the present invention considers the multirate case. It is possible to use Kaufman and Robert's recursive blocking formula from the stochastic knapsack problem. Unfortunately it is quite complicated to find explicitly a smooth extension to real capacity values. Therefore, in a preferred embodiment of the present invention, in order to enhance computational feasibility, a normal approximation is used for the blocking function (see Appendix A for details):

$$E_{hk}(\vec{\rho}_k, C_k) = \frac{\Phi\left(\frac{C_k - \rho_k}{\sigma_k}\right) - \Phi\left(\frac{C_k - \rho_k - a_{hk}}{\sigma_k}\right)}{\Phi\left(\frac{C_k - \rho_k}{\sigma_k}\right)} \quad (11)$$

where it is assumed that the amount of offered bandwidth at logical link k follows a normal distribution with mean $\rho_k$ and variance $\sigma_k^2$, where $\rho_k = \Sigma_i \rho_{ik}$ and $\sigma_k^2 = \Sigma_i \sigma_{ik}^2$. $\Phi$ denotes the standard normal distribution function, and since $\Phi$ is smooth, therefore $E_{hk}$ will be smooth in all variables. Note that this normal approximation approach should be viewed as an example in order to illustrate one way of dealing with the link blocking function.

By differentiation of (11), applying the well known chain rule, the partial derivatives of the blocking function can be explicitly expressed as:

$$\frac{\partial E_{hk}}{\partial C_k} = \frac{1}{\sigma_k} \frac{\phi\left(\frac{C_k - \rho_k}{\sigma_k}\right) - \phi\left(\frac{C_k - \rho_k - a_{hk}}{\sigma_k}\right)}{\Phi\left(\frac{C_k - \rho_k}{\sigma_k}\right)} - \frac{1}{\sigma_k} \frac{\phi\left(\frac{C_k - \rho_k}{\sigma_k}\right)\left(\Phi\left(\frac{C_k - \rho_k}{\sigma_k}\right) - \Phi\left(\frac{C_k - \rho_k - a_{hk}}{\sigma_k}\right)\right)}{\left(\Phi\left(\frac{C_k - \rho_k}{\sigma_k}\right)\right)^2} \quad (12)$$

and $$\frac{\partial E_{hk}}{\partial \rho_{ik}} = \frac{1}{\sigma_k} \frac{\left(1 - \frac{C_k - \rho_k}{\sigma_k^2}\right)\phi\left(\frac{C_k - \rho_k}{\sigma_k}\right) - \left(1 - \frac{C_k - \rho_k - a_{ik}}{\sigma_k^2}\right)\phi\left(\frac{C_k - \rho_k - a_{hk}}{\sigma_k}\right)}{\Phi\left(\frac{C_k - \rho_k}{\sigma_k}\right)} - \frac{1}{\sigma_k} \frac{\left(1 - \frac{C_k - \rho_k}{\sigma_k^2}\right)\phi\left(\frac{C_k - \rho_k}{\sigma_k}\right)\left(\Phi\left(\frac{C_k - \rho_k}{\sigma_k}\right) - \Phi\left(\frac{C_k - \rho_k - a_{hk}}{\sigma_k^2}\right)\right)}{\left(\Phi\left(\frac{C_k - \rho_k}{\sigma_k}\right)\right)^2} \quad (13)$$

where $\phi$ denotes the standard normal density function.

Now, all the expressions needed to obtain an expression, although very complicated, for the partial derivatives of the network revenue with respect to the logical link capacities are presented. The combination of the expressions (7), (8), (9), (10), (12) and (13) yields this expression for the revenue derivatives.

One of the oldest and most widely known methods for minimizing or maximizing a function of several variables is the method of steepest descent (or ascent as in the present case) which is often referred to as the gradient method. The gradient method is an iterative method capable of solving both linear and non-linear problems. It is based on the fact that the gradient of a multivariable function, i.e. the vector of partial derivatives for the function, points, at each point, in the direction in which the function changes (increases or decreases) at the highest rate. In addition, the optimal step size in this direction is determined by a line search. Hence, the method is appropriately designed for climbing towards a maximum of a multivariable function.

In accordance with a first preferred embodiment of the invention the partial derivatives for the network revenue with respect to the logical link capacities, as defined above, are applied in a gradient based hill climbing procedure in order to maximize the total network revenue as defined by (2). Let $\nabla W(C_1, C_2, \ldots, C_J)$ denote the gradient vector of the total network revenue with respect to the logical link capacities.

The physical constraints of the optimization problem, $SC \leq C_{phys}$ and $C \geq 0$, define a feasibility region which is a convex polyhedron. These physical constraints have to be taken into account in the gradient based hill climbing procedure, since each step in the actual hill climbing must end within the feasibility region.

At first, an initial design point for the logical link capacities associated with the various logical networks is selected. Subsequently, the logical link capacities are iteratively calculated by an alternating sequence of calculating the optimal ascend or step direction using the revenue gradient vector $\nabla W(C_1, C_2, \ldots, C_J)$ and performing a one-dimensional line search to find an optimal point. Each step in the actual hill climbing must be in consistency with the feasibility region defined by the physical constraints. The iteration process is terminated when convergence is achieved with a required level of accuracy. The physical link capacities are then allocated among the logical links of the various logical networks in accordance with the finally calculated logical link capacities.

Figure 5:
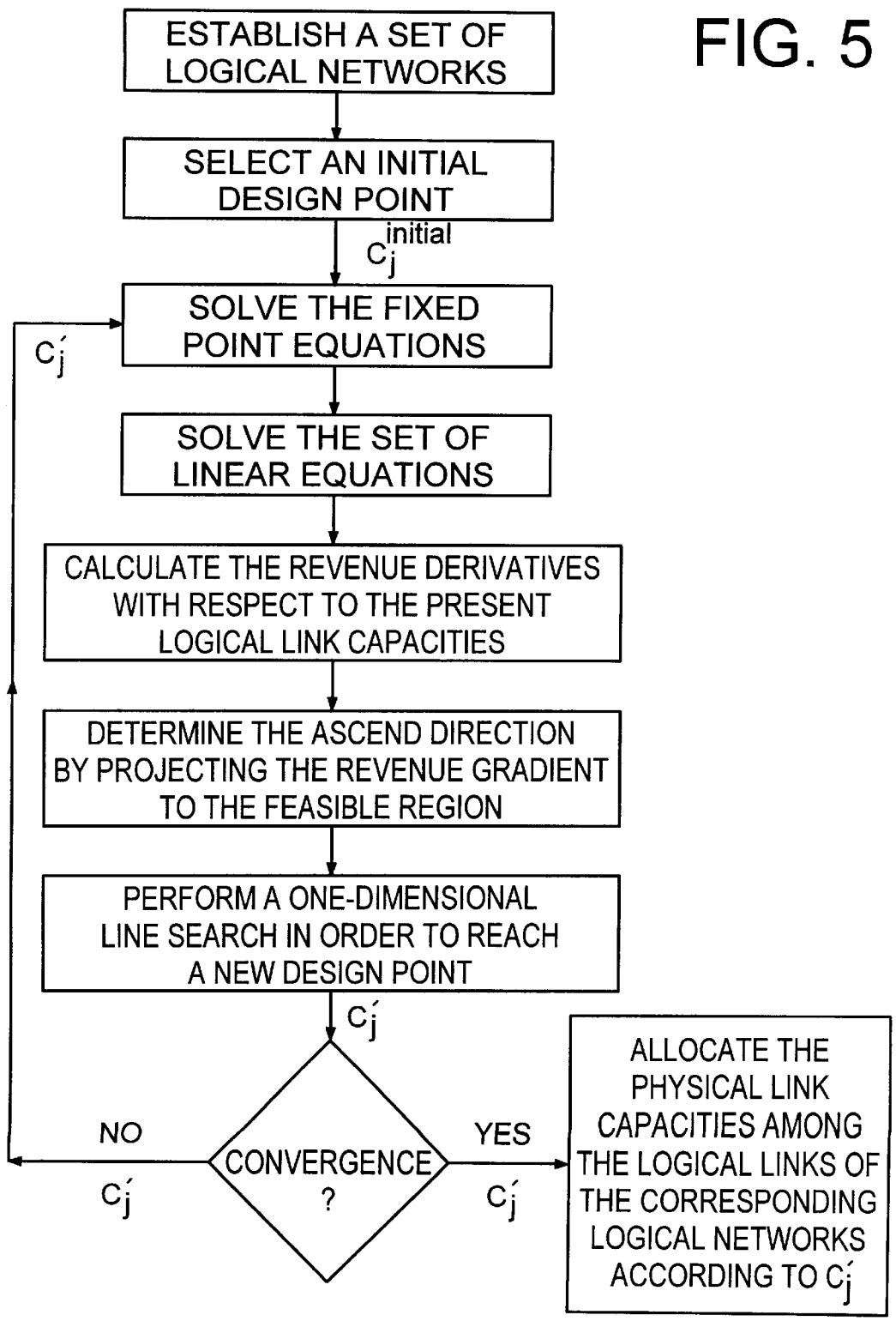
FIG. 5 is a flow diagram illustrating, in more detail, a method in accordance with a first preferred embodiment of the invention.

For a better understanding of the invention a method according to a first preferred embodiment will be described in more detail with reference to the schematic flow diagram of FIG. 5. In the first step, a set of logical networks is established on top of a physical network by associating different parts of the traffic with different parts of the physical transmission and switching resources. Next, initial values for the logical link capacities $C_j^{initial}$ (for all j), which can be seen as an initial design point, are selected. Then, the fixed point equations defined by (3)–(6) are solved by successive substitutions, thereby computing a set of blocking probabilities $B_{ik}$ to be used in subsequent steps. In order to calculate the partial derivatives for the network revenue the set of linear equations that is defined by (9) and (10) has to be solved. The solution will yield the set of auxiliary parameters $c_{ik}$ that is needed for calculating the revenue derivatives. Now, the present logical link capacities, the blocking probabilities and the auxiliary parameters are known. Next, the actual calculation of the revenue derivatives with respect to the present values of the logical link capacities takes place. Thus, the gradient vector for the network revenue is known and the optimal ascend or step direction at the present design point can be determined. If the present design point is situated at the boundary of the feasibility region and the calculated gradient vector points out from the feasibility region, then the direction of the next step in the hill climbing is calculated by projecting the gradient vector so that it follows the boundary. In fact, if identity projections (i.e. projections of the gradient which coincides with the gradient) are included, one could say that the next step in the actual hill climbing is always taken in the direction of the projection of the gradient of the network revenue to the feasibility region. Alternatively, in this particular case, a penalty function procedure can be utilized to determine the direction of the next step. Furthermore, a one-dimensional line search is performed along the ascend or step direction to optimize the size of the step to be taken in the actual hill climbing. Of course, as mentioned above, every step, determined by the direction and the step size, in the hill climbing has to be consistent with the feasible region. When the ascend direction, the step size and the physical constraints all are taken into account a new design point is reached, representing a new set of logical link capacities $C_j'$ (for all j). Now, a convergence test is carried out. If the convergence conditions are not satisfied, the procedure will be repeated, but now the steps of establishing the logical networks and selecting an initial design point are omitted. Instead, the new set of logical link capacities $C_j'$ is used as a new design point in the fixed point equations. This will lead to the computation of a new set of blocking probabilities, auxiliary parameters, revenue derivatives and subsequently also of a yet another set of logical link capacities. However, if the convergence conditions are satisfied, the physical link capacities are allocated among the logical links of the corresponding logical networks according to the finally calculated logical link capacities.

If the cross connect is based on SDH, the partitioning can only be performed in integer portions of the STM modules of the SDH structure, as mentioned above. In this particular case, the real capacity values obtained from the method according to the first preferred embodiment of the invention are preferably rounded into integer values such that the physical constraints are satisfied. In one embodiment of the invention this is realized by independently repeated random rounding trials.

The method according to the first preferred embodiment of the invention is preferably performed by one or more control programs CP of the control program module of the operation and support system OSS. These control programs, in turn, are executed by one or more of the processors in the processor system PS described above. The operation and support system OSS collects the required information from the network system and uses this information together with the database DB information as input to the respective control programs CP. Furthermore, the OSS controls the network switches through the data links so as to partition the physical link capacities among the logical links of the logical networks.

Figure 6:
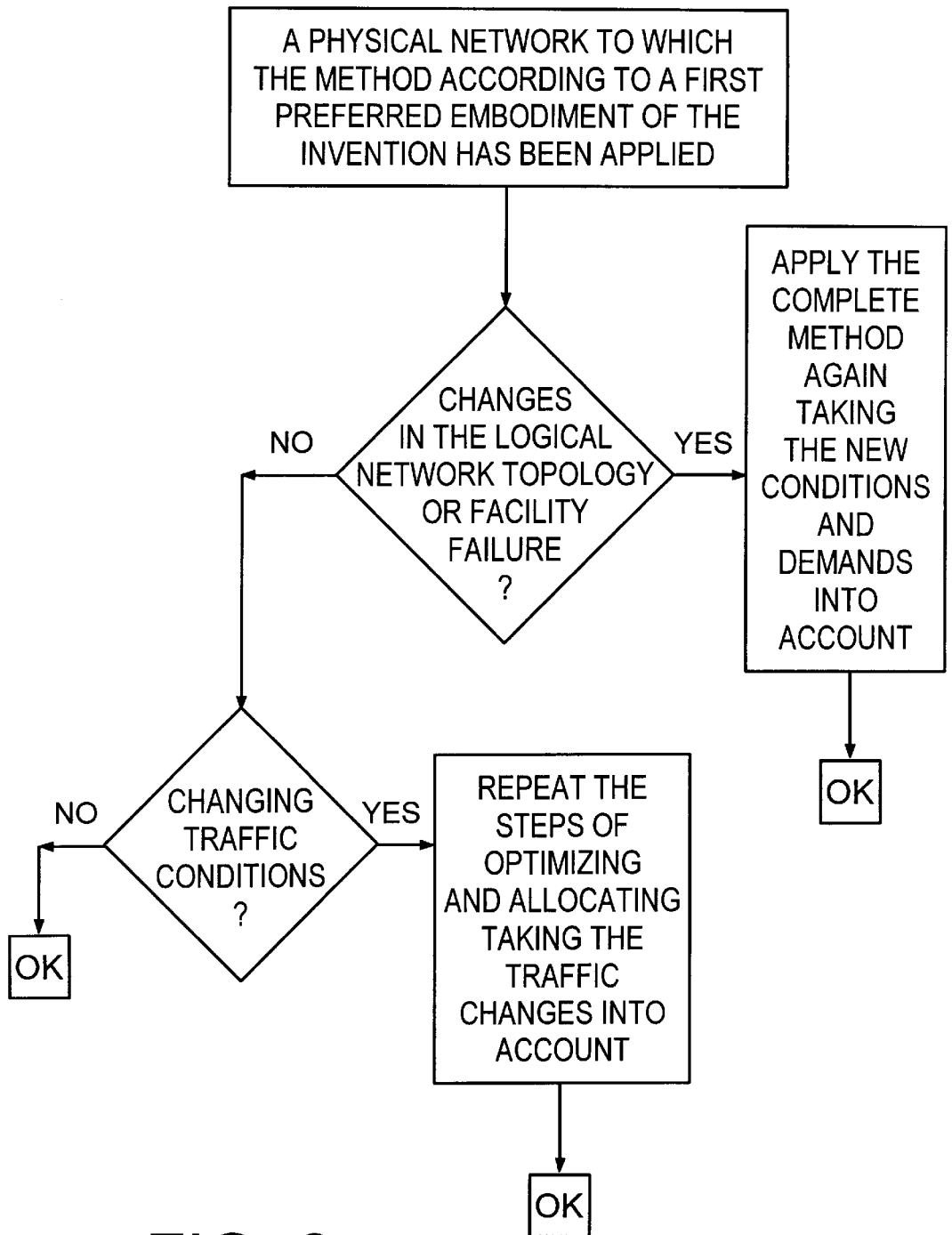
FIG. 6 is a schematic flow diagram illustrating how the method in accordance with a first preferred embodiment of the present invention flexibly adapt the overall network system to changing traffic conditions, but also to facility failures and demands for new logical network topologies.

Accordingly, the network manager can flexibly adapt the overall network system to changing traffic conditions, such as changes in offered traffic, but also to facility failures and new demands on the logical network topology from e.g. business users, as is illustrated in the schematic flow diagram of FIG. 6. Once the method or device according to the first preferred embodiment of the invention has been applied to a physical network, the partitioning is optimal. However, if, at a later time, the topology of one or more logical networks have to be changed for some reason (facility failure or demands for new topologies) or additional logical networks are requested, then the complete set of steps according to the first preferred embodiment of the present invention has to be performed in order to optimize the overall network configuration. If no changes regarding the topology of the logical networks is necessary, but e.g. the offered traffic varies, then only the optimization and allocation steps of the first preferred embodiment of the present invention have to be carried out. That is, the optimization step and the allocation step are repeated in response to changing traffic conditions so as to change the logical link capacities of the various logical networks in a flexible and optimal way. This is realized by the switches and cross connect devices of the physical network in a very short period of time. Thus, the realization of the present invention renders the operation of the complete physical network both safe and flexible.

The method in accordance with the present invention regards the logical link capacities as fixed in each iteration step. Of course, from the viewpoint of the whole optimization procedure the logical link capacities are not fixed parameters since it is desired to optimize them. Moreover, in each iteration step, the strictly non-linear objective function is approximated as a linear function valid in a neighborhood of the fixed point, but seen from the whole procedure the objective function is non-linear since the objective function itself is changing in an indirectly non-linear way in each iteration step.

Since the gradient method in general converges towards a local optimum the selection of initial values for the logical link capacities has to be correctly performed in a suitable way. By a careful choice of initial design point the risk of finding a local optimum that falls far from the global optimum is negligible. One choice of initial values is the solution of the corresponding deterministic flow problem that can be seen as the limiting case where logical link capacities and offered traffic values tend to infinity. However, in accordance with a preferred embodiment of the invention, the initial point is selected as the solution of a convexification of the problem.

The article "Resource separation—an Efficient Tool for Optimizing ATM Network Configuration" by A. Faragó, S. Blaabjerg, W. Holender, T. Henk, A. Szentesi and Z. Ziaja in Networks '94, (September 1994) relates to an approximative method which finds a global optimum for a modified concave network revenue function by convex optimization.

In general, the complexity of computing blocking probabilities is much larger in the case where many different bandwidth demands (traffic types) co-exist. An efficient way of avoiding the increased complexity is to approximate the blocking probability for a traffic type requiring d units of bandwidth by grabbing d times one unit independently. In other words, a non-unity bandwidth call is modelled by a sequence of independent unity bandwidth calls. In the article "Blocking Probabilities in Multitraffic Loss Systems: Insensitivity, Asymptotic Behavior and Approximations" by Labourdette and Hart in IEEE Trans. Communications, 40 (1992/8) pp. 1355–1366. it is proven that this approximation is correct in the asymptotic sense.

Adopting the approximation in the above paragraph and assuming all revenue coefficients are the same, independently of traffic types, and utilizing the convex optimization method (COM) of Faragó et al. referred to above, a global optimum is guaranteed.

Although the convex optimization method (COM) yields a global optimum, it is obtained in a relatively rough model. In accordance with the present invention a gradient based hill climbing is used to come from the initial point obtained from the COM method to an improved value in the more refined model of the present invention.

In the regime where the capacities are large, and if the approximation of modelling a non-unity bandwidth call with a sequence of unity bandwidth calls is adopted, a device as described in our Patent Application 9500838-9 can be used to obtain an initial design point for the logical link capacities. The device comprises two artificial neural networks interworking to compute a set of logical link capacities representing a global optimum. In this case also, the global optimum is obtained in a model which is relatively rougher than the model of the present invention.

It is evident that in many practical circumstances a solution with a minimum guaranteed resource and possibility to use a certain number of extra resources will be applied. By way of example, the physical constraint $C \geq 0$ can be altered to $C \geq C_{constant}$, where $C_{constant}$ is a constant capacity vector representing a minimum guaranteed resource for each individual logical link. Of course, the physical constraint $SC \leq C_{phys}$ can not be violated.

As mentioned above, in a preferred embodiment of the invention, the aggregated offered traffic of type i to node pair p in logical network υ is given for all logical networks, node pairs and traffic types. However, the total network revenue depends also on the offered traffic to each route, $v_r$, and hence the overall network performance is affected by the distribution of offered traffic among the routes which can realize the communication even within a single logical network. It may appear natural to distribute the offered traffic load uniformly among parallel routes, but in general this distribution is far from optimal.

Therefore, in accordance with a second preferred embodiment of the present invention, the distribution of the offered traffic load of type i to node pair p in logical network υ, for all i, p and υ, is determined together with the partitioning of the physical link capacities among the logical links of the various logical networks, such that the overall network performance is optimized. In addition, by distributing, for each individual node pair in each one of the logical networks, the offered traffic load among the routes carrying traffic between the nodes of the individual node pair, overload situations are avoided and in general load balancing is achieved.

The distribution of the offered traffic between the possible routes is termed load sharing, and the parameters according to which it takes place is called load sharing coefficients. For a given logical network υ, node pair p and traffic type i let $s^{(\upsilon,p,i)} = (S_{r1}^{(\upsilon,p,i)}, S_{r2}^{(\upsilon,p,i)}, \ldots)$ denote the load sharing vector. The components of $S^{(\upsilon,p,i)}$ tell us in what proportion the load is distributed among the routes that carry traffic type i between the O-D pair p in logical network υ. Naturally, the components of each load sharing vector are non-negative and their sum is equal to 1.

Now, the optimization task according to a second preferred embodiment of the invention is to determine the logical link capacities of the various logical networks and the typewise load sharing coefficients for the node pairs in each one of the logical networks so that the total expected network revenue is maximized, while the physical constraints are satisfied. In mathematical terms this can be formulated as follows:

Maximize $$W = \sum_{\upsilon,p,i} \sum_{r \in R(\upsilon,p,i)} w_r v_{(\upsilon,p,i)} s_r^{(\upsilon,p,i)} (1 - L_r) \qquad (14)$$

subject to $$SC \leq C_{phys},\ C \geq 0,\ s_r^{(\upsilon,p,i)} \geq 0,\ \sum_{r \in R(\upsilon,p,i)} s_r^{(\upsilon,p,i)} = 1 \qquad (15)$$

On the basis of the mathematical framework set forth above, the revenue derivative with respect to offered traffic along route r can be expressed as:

$$\frac{\partial W}{\partial v_r} = (1 - L_r)\left(w_r - \sum_i \sum_j A_{ijr} a_{ij} c_{ij}\right) \qquad (16)$$

where the set of auxiliary parameters $c_{ik}$ is defined by the system of linear equations given by (9) and (10). Together with the partial derivatives for the network revenue with respect to the logical link capacities, as given above, the revenue derivatives with respect to the route offered traffic values are applied in a gradient based hill climbing procedure in order to maximize the network revenue function. Once again the physical constraints define a convex feasibility region, which has to be considered in the actual hill climbing.

Figure 7:
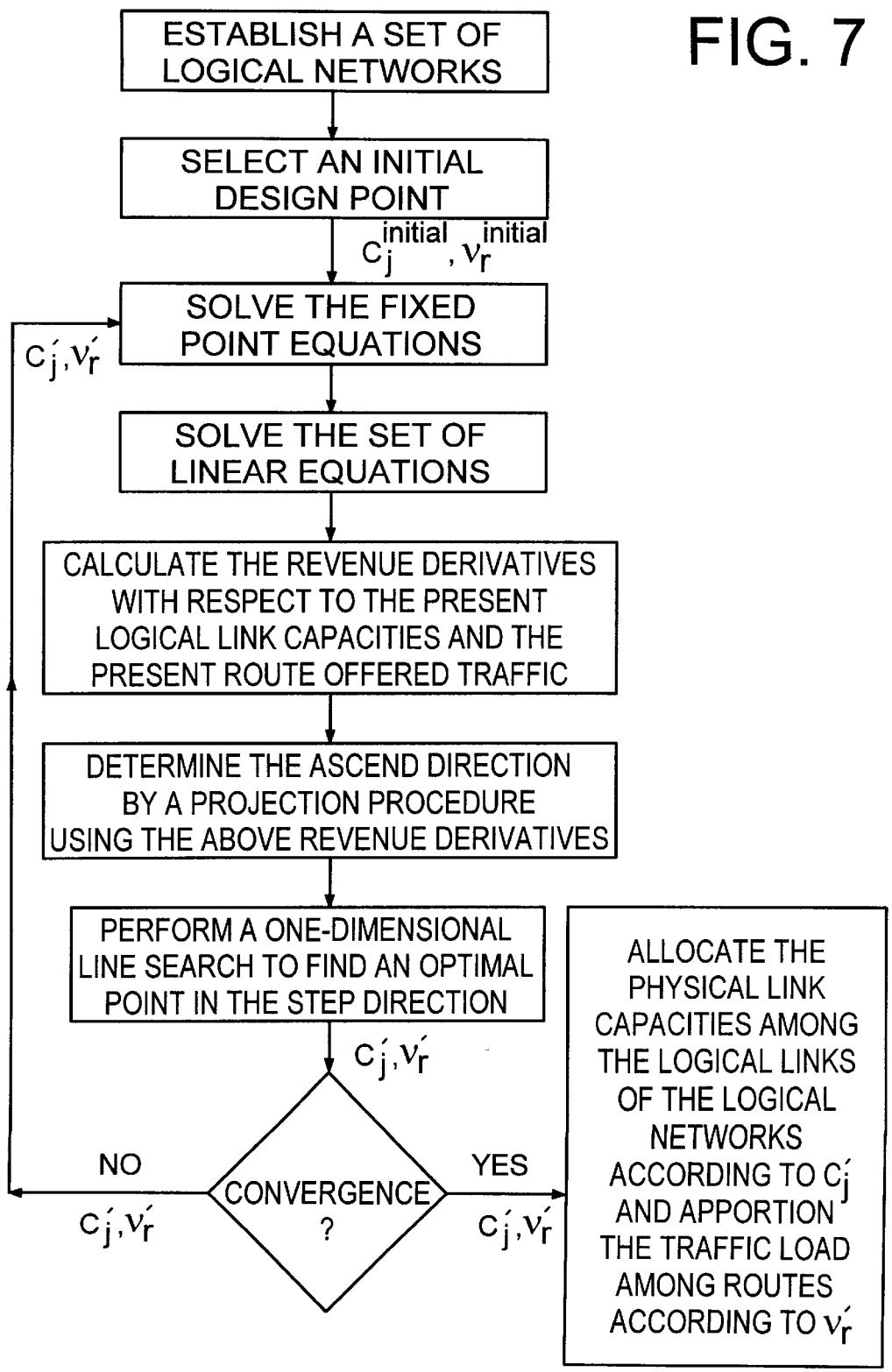
FIG. 7 is a flow diagram illustrating a method in accordance with a second preferred embodiment of the invention.

With reference to the flow diagram of FIG. 7 a method in accordance with a second preferred embodiment of the invention is illustrated. At first, a set of logical networks is established on top of a physical network. Next, an initial design point for the logical link capacities $C_j^{initial}$ and the route offered traffic values $v_r^{initial}$ in each one of the logical networks is selected. Preferably, the offered load is distributed along shortest paths as a good initial choice for the route offered traffic values. Subsequently, logical link capacities and route offered traffic values are iteratively calculated by an alternating sequence of calculating the optimal ascend or step direction using the revenue gradient vector with respect to both the logical link capacities and the route offered traffic and performing a one-dimensional line search to find an optimal point. The partial derivatives with respect to the present logical link capacities and the present route offered traffic values, constituting the revenue gradient vector in this particular embodiment, have to be calculated in each iteration step. This means that the fixed point equations (3)–(6) and the set of linear equations (9)–(10) also have to be solved in each iteration. Each step along the ascend or step direction in the actual hill climbing must be in consistency with the feasibility region defined by the physical constraints given in (15). This is achieved by a projection procedure as mentioned above. The iteration process is terminated when convergence is achieved with a required level of accuracy. In all other regards the gradient based hill climbing procedure is similar to the one in which only the revenue derivatives with respect to the logical link capacities were considered. Now, the logical link capacities for the various logical networks and the route offered traffic values in each logical network which maximizes the revenue function are known. Consequently, the optimal distribution of the offered traffic load of type i to node pair p in logical network υ is known for all i, p and υ, and the corresponding load sharing coefficients are calculated in a straightforward way. The physical link capacities are then allocated among the logical links of the various logical networks in accordance with the finally calculated logical link capacities. Similarly, the traffic load is apportioned, for each individual node pair in each one of the logical networks, among the routes which can realize communication between the nodes of the individual node pair, in accordance with the finally calculated set of load sharing coefficients.

The second preferred embodiment is preferably realized by one or more control programs CP which are executed by the processor system PS incorporated in the operation and support system OSS described above. The operation and support system OSS collects the required information from the network system and uses this information together with the database DB information as input to the respective control programs CP. Furthermore, the OSS controls the overall network system through the data links.

In one embodiment of the invention the apportioning is preferably realized by routing decision means. For example, assume that there are two different routes between a node pair. The load sharing coefficients for the first and second route are 0,6 and 0,4 respectively. When a call request comes to the node pair a random number between 0 and 1 is generated by random number generator means. If the random number is less than 0,6 then the first route is to be used, and if the random number is greater or equal to 0,6 then the second route is to be used.

Figure 8:
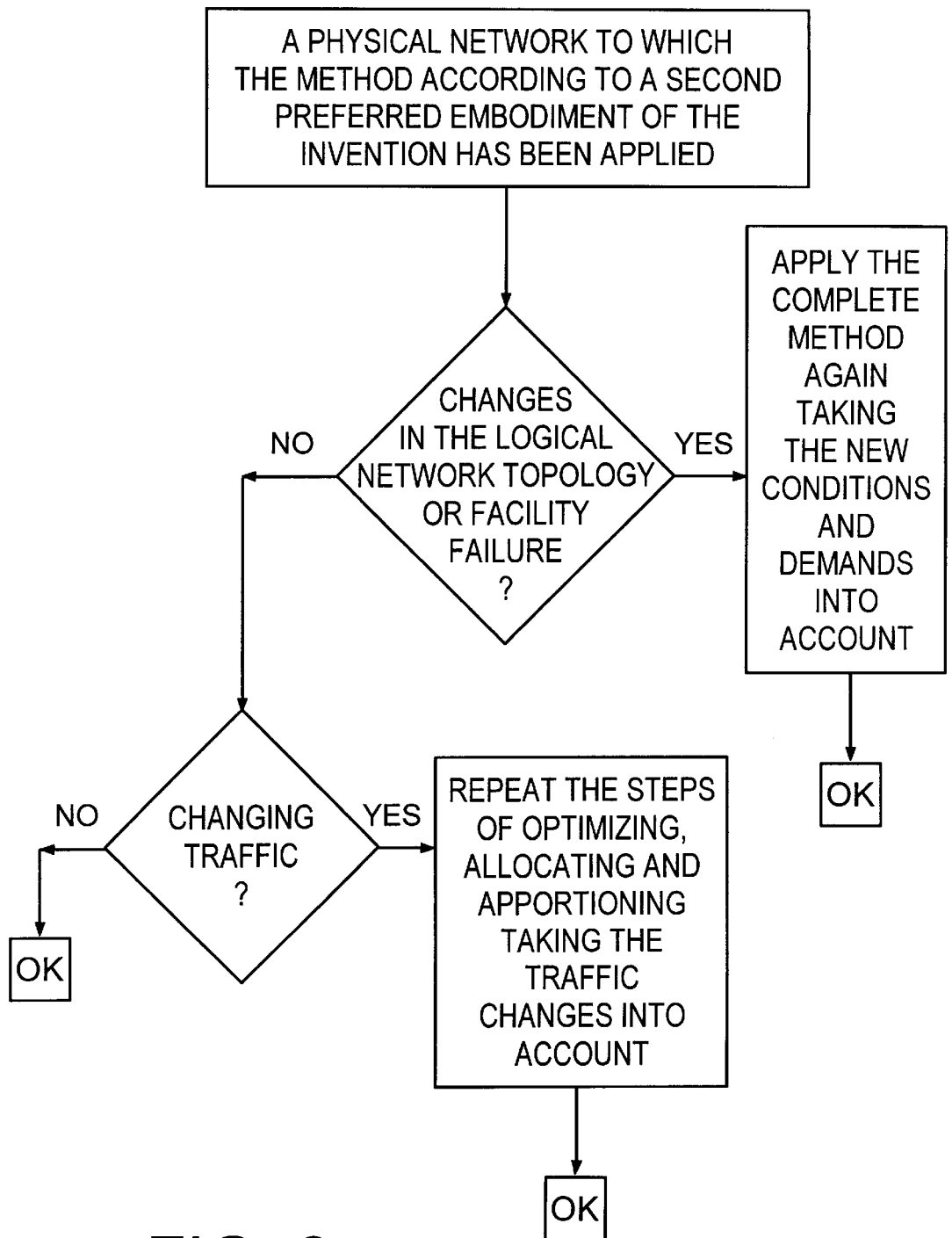
FIG. 8 is a schematic flow diagram illustrating how the method in accordance with a second preferred embodiment of the present invention flexibly adapt the overall network system to changing traffic conditions, but also to facility failures and demands for new logical network topologies.

In similarity to the first preferred embodiment of the invention, the second preferred embodiment allows the network manager to flexibly adapt the overall network system to changing traffic conditions, such as changes in offered traffic, but also to facility failures and new demands on the logical network topology from e.g. business users. This is illustrated in the schematic flow diagram of FIG. 8. Once the method or device according to the second preferred embodiment of the invention has been applied to a physical network, the partitioning of physical resources and the distribution of offered traffic load is optimal. However, if, at a later time, the topology of one or more logical networks have to be changed for some reason (facility failure or demands for new topologies) or additional logical networks are requested, then the complete set of steps according to the second preferred embodiment of the present invention has to be performed in order to optimize the overall network configuration. If no changes regarding the topology of the logical networks are necessary, but the traffic varies, then only the optimizing, allocating and apportioning steps of the second preferred embodiment of the present invention have to be carried out. That is, the optimizing step, the allocating step and the apportioning step are repeated in response to changing traffic conditions so as to change the logical link capacities and the route offered traffic values of the various logical networks in a flexible and optimal way.

It is evident that it is equally possible to optimize the network revenue or the other objective functions mentioned above with respect to the route offered traffic values alone without considering the logical link capacities. In other words, determining the optimal distribution of the offered traffic load of type i to node pair p in logical network υ for all i, p and υ.

Therefore, in accordance with a third preferred embodiment of the invention, the typewise load sharing coefficients for each node pair in each one of the logical networks are determined so that the total expected network revenue is maximized, while the physical constraints are satisfied. In mathematical terms this is formulated in the following way:

Maximize $$W = \sum_{\upsilon,p,i} \sum_{r \in R^{(\upsilon,p,i)}} w_r \gamma_{(\upsilon,p,i)} s_r^{(\upsilon,p,i)} (1 - L_r) \qquad (17)$$

subject to $$s_r^{(\upsilon,p,i)} \geq 0, \quad \sum_{r \in R^{(\upsilon,p,i)}} s_r^{(\upsilon,p,i)} = 1 \qquad (18)$$

Figure 9:
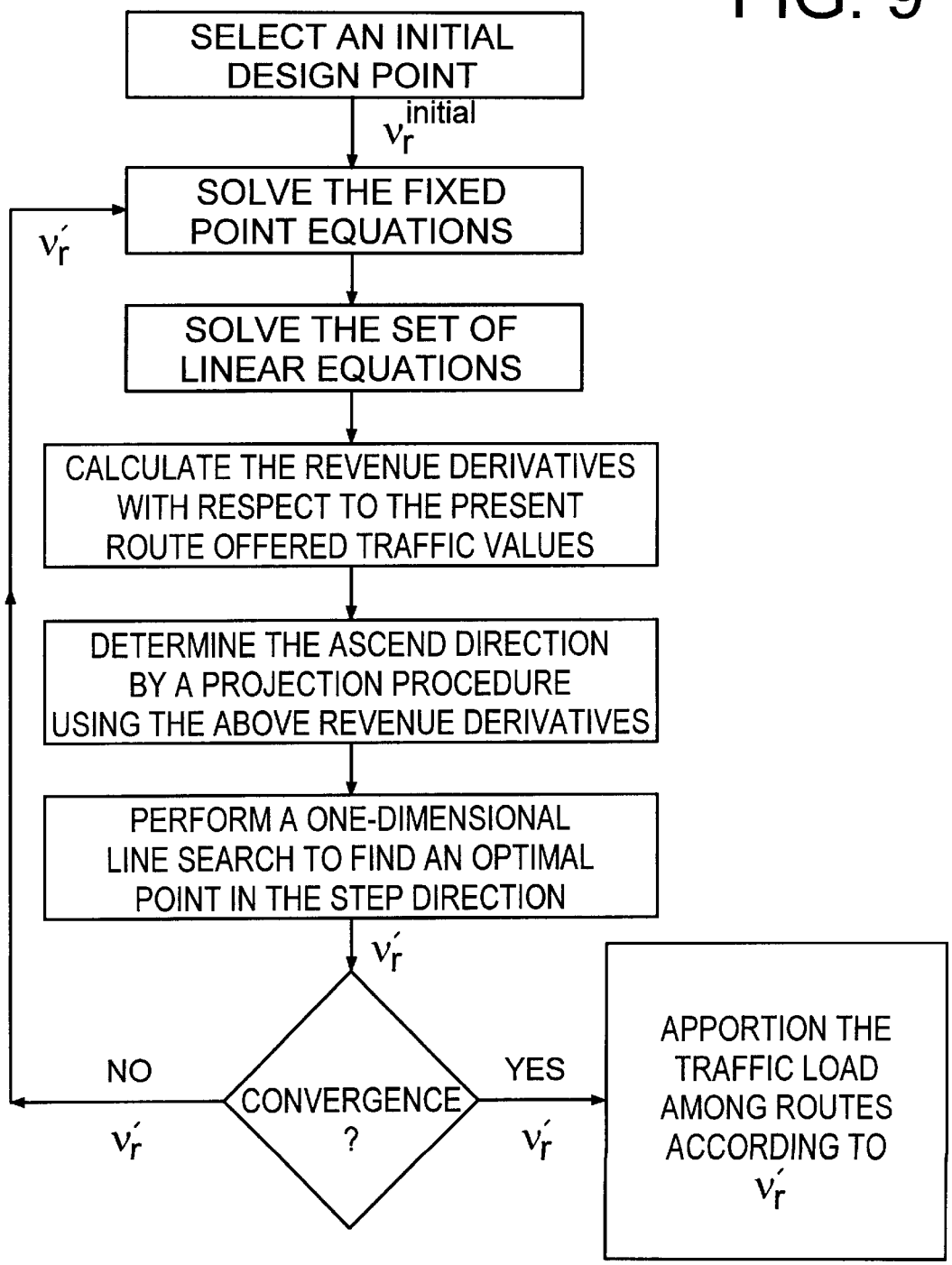
FIG. 9 is a flow diagram illustrating a method in accordance with a third preferred embodiment of the invention.

In FIG. 9 there is illustrated a schematic flow diagram of a third preferred embodiment of the present invention. First, initial values for the route offered traffic in each one of the logical networks are selected as an initial design point. Preferably, the offered load is distributed along shortest paths as an initial choice. Subsequently, route offered traffic values are iteratively calculated by an alternating sequence of calculating the optimal ascend or step direction using the revenue gradient vector with respect to the route offered traffic (using expression (16)) and performing a one-dimensional line search to find an optimal point by optimizing the step size.

Since the route offered traffic is changed in the actual hill climbing, the fixed point equations (3)–(6) have to be solved in each iteration. Furthermore, the set of linear equations (9)–(10) has to be solved in each iteration in order to calculate the partial derivatives of the network revenue with respect to the present route offered traffic values. Each step along the ascend or step direction in the actual hill climbing must be in consistency with the feasibility region defined by the physical constraints. This is achieved by a projection procedure similar to the one in the first and second preferred embodiments of the invention. The iteration process is terminated when convergence is achieved with a required level of accuracy. In all other regards the gradient based hill climbing procedure is similar to the one in the second preferred embodiment. Now, the route offered traffic values for each logical network which maximizes the network revenue function are known. Consequently, the optimal distribution of the offered traffic load of type i to node pair p in logical network υ is known for all i, p and υ, and the corresponding load sharing coefficients are calculated in a straightforward way. Then, the offered traffic load is apportioned, for each individual node pair in each one of the logical networks, among the routes which can realize communication between the nodes of the individual node pair, in accordance with the finally calculated load sharing coefficients.

The third preferred embodiment is preferably realized by one or more control programs CP which are executed by the processor system PS incorporated in the operation and support system OSS.

In one embodiment, the apportioning of offered traffic load Is performed by routing decision means using random number generator means.

Note that the accompanying drawings are simple illustrative examples illustrating the inventive concept of the present invention. In practice, the physical network and the logical networks are, in general, very extensive with e.g. intermediate logical nodes which are not directly associated with access points and logical links using more than one physical link.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

Experimental Results

The present invention was tried on a very simple network. It was a four-node ring network on top of which two logical networks with one traffic class in each were established. These traffic classes were different, so there were altogether two traffic classes. Two parameters were varied: the ratio of the single-call bandwidth demand in the two traffic classes (bandwidth ratio—BR) and the ratio of the offered traffic load in the two classes (offered traffic ratio—OTR).

Figure 10:
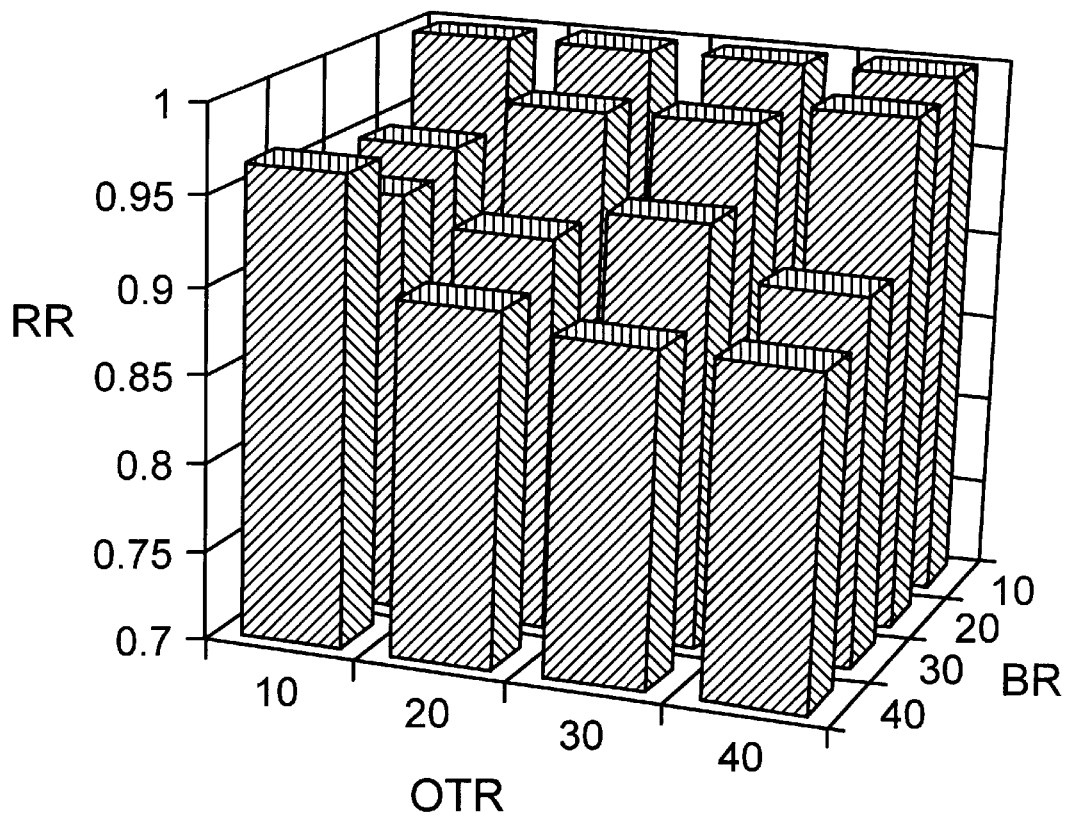
FIG. 10 presents experimental results illustrating how much gain is achieved by the proposed invention in comparison to initial values obtained from a convex optimization method (COM).

In order to see how much gain is achieved by the proposed invention in comparison to the initial values obtained from the convex optimization method (COM), the revenue ratio—RR, i.e. the revenue achieved by the COM method divided by the revenue achieved by the second preferred embodiment of the present invention, was measured. The result is shown in FIG. 10. If the varied ratios were below 10, the present invention improved the result insignificantly. On the other hand, as the traffic scenario gets more inhomogeneous, the additional gain obtained by the present invention becomes more and more substantial. Consequently, if the proposed invention is applied to large telecommunication networks, such as an ATM network, with several logical networks carrying a number of widely different traffic types it is very likely that the invention will considerably improve the result, as is shown by the overall tendency of the experiments.

APPENDIX A

In order to enhance computational feasibility, a normal approximation is used for the blocking function. Assume that the amount of offered bandwidth at logical link k follows a normal distribution with mean $\rho_k$ and variance $\sigma_k^2$, where $\rho_k = \Sigma_i \rho_{ik}$ and $\sigma_k^2 = \Sigma_i \sigma_{ik}^2$. From the reduced load approximation, we have $$\rho_{ik} = (1 - B_{ik})^{-1} \sum_r \nu_r (1 - L_r) A_{ikr} a_{ik} \quad \text{(A1)}$$

and $$\sigma_{ik}^2 = (1 - B_{ik})^{-1} \sum_r \nu_r (1 - L_r) A_{ikr} (a_{ik})^2 = a_{ik} \rho_k \quad \text{(A2)}$$

By applying the renormalizing procedure that is valid for time reversible Markovian systems and from the assumption of a normal distribution we arrive at $$E_{hk}(\vec{\rho}_k, C_k) = \frac{\Phi\left(\frac{C_k - \rho_k}{\sigma_k}\right) - \Phi\left(\frac{C_k - \rho_k - a_{hk}}{\sigma_k}\right)}{\Phi\left(\frac{C_k - \rho_k}{\sigma_k}\right)} \quad \text{(A3)}$$

where $\Phi$ denotes the standard normal distribution function. Since $\Phi$ is smooth, therefore $E_{hk}$ will be smooth in all variables.

We claim:

1. In a physical network comprising physical transmission and switching resources, and carrying different traffic types, a method for partitioning said physical transmission resources among logical networks, comprising the steps of:

establishing said logical networks on top of said physical network such that said logical networks are at least based on said physical network and said traffic types, said logical networks comprising nodes and logical links that extend between said nodes, optimizing, given an objective function, the operation of said physical network, viewed as the set of said logical networks, according to said given objective function, said optimizing step being performed with respect to decision variables comprising capacity values of said logical links, and said objective function comprising variables which depend upon the traffic type, wherein said step of optimizing the operation of the physical network comprises the steps of:

selecting initial values for the capacity values of said logical links associated with said logical networks, iteratively calculating, given said objective function, new logical link capacities associated with said logical networks, and terminating said iteration process when at least one convergence condition is met, and wherein said step of allocating is performed according to the finally calculated logical link capacities, and allocating said physical transmission resources among said logical links of said logical networks according to the capacity values of said logical links after said optimization, wherein the operation of said physical network is optimized according to said given objective function and with consideration to the traffic types.

2. The method of claim 1, wherein the optimizing step is subject to physical constraints defining a feasibility region.

3. The method of claim 2, wherein the step of iteratively determining logical link capacities comprises the steps of calculating a gradient of the objective function with respect to the decision variables and using the gradient to obtain new logical link capacities in the iterative determination.

4. The method of claim 3, wherein the step of using the gradient of the objective function to obtain new logical link capacities further comprises the steps of performing a one-dimensional line search to find an optimal step size in a direction of a projection of the gradient of the objective function to the feasibility region, and taking a step in the direction according to a found step size.

5. The method of claim 1, wherein logical link capacity values obtained from a convex optimization method are selected as the initial values for the logical link capacities.

6. In a physical network comprising physical transmission and switching resources, and carrying different traffic types, a method for partitioning said physical transmission resources among logical networks, comprising the steps of:

establishing said logical networks on top of said physical network such that said logical networks are at least based on said physical network and said traffic types, said logical networks comprising nodes and logical links that extend between said nodes, optimizing, given an objective function, the operation of said physical network, viewed as the set of said logical networks, according to said given objective function, said optimizing step being performed with respect to decision variables comprising capacity values of said logical links, and said objective function comprising variables which depend upon the traffic type, and allocating said physical transmission resources among said logical links of said logical networks according to the capacity values of said logical links after said optimization, wherein the operation of said physical network is optimized according to said given objective function and with consideration to the traffic types and wherein said logical links are used by routes and said decision variables further comprise route offered traffic values, each of said routes being defined as a subset of logical links which interconnect the nodes of a node pair within a given logical network, and wherein said method further comprises the step of distributing, for each individual node pair in each one of said logical networks, offered traffic load among the routes which can realize communication between the nodes of the individual node pair, in accordance with the route offered traffic values after said optimization.

7. The method of claim 6, wherein the optimizing step is executed with physical network data, a topology of the logical networks, traffic type information, routes in each of the logical networks, and offered traffic to each node pair in each logical network as input information.

8. The method of claim 6, wherein the optimizing step, allocating step, and distributing step are repeated in response to changing traffic conditions so as to adapt partitioning of the physical transmission resources and distributing of the offered traffic load to prevailing traffic.

9. The method of claim 6, wherein the optimizing step further comprises the steps of:

selecting initial values for the decision variables;
iteratively determining, based on the objective function, new values for the decision variables; and
terminating the iterative determination when at least one convergence condition is met; and
the allocating and distributing steps are performed according to the iteratively determined values for the decision variables.

10. The method of claim 9, wherein the optimizing step is subject to physical constraints defining a feasibility region.

11. The method of claim 9, wherein the iteratively determining step comprises the steps of calculating a gradient of the objective function with respect to the decision variables and using the gradient to obtain new values for the decision variables in the iterative determination.

12. The method of claim 11, wherein the step of using the gradient of the objective function further comprises the steps of performing a one-dimensional line search to find an optimal step size in a direction of a projection of the gradient of the objective function to a feasibility region, and taking a step in the direction according to a found step size.

13. In a physical network comprising physical transmission resources and carrying different traffic types, a device for partitioning said physical transmission resources among logical networks, comprising:

means for establishing said logical networks on top of said physical network such that said logical networks are at least based on said physical network and said traffic types, said logical networks comprising nodes and logical links that extend between said nodes, means for optimizing a given objective function which is representative of the performance of said physical network viewed as the set of said logical networks, said objective function comprising variables which vary with the traffic type, and said optimizing step being performed with respect to decision variables comprising capacity values of said logical links, and means for allocating said physical transmission resources among said logical links of said logical networks according to the capacity values of said logical links after said optimization, wherein said logical links are used by routes and said decision variables further comprise route offered traffic values, a route being defined as a subset of logical links which interconnect the nodes of a node pair within a given logical network, and said device further comprising means for distributing, for each individual node pair in each one of said logical networks, offered traffic load among the routes which can realize communication between the nodes of the individual node pair, in accordance with the route offered traffic values after said optimization.

14. In a physical network comprising physical transmission and switching resources, a method for distributing offered traffic load among routes interconnecting the nodes of the node pairs, comprising the steps of:

optimizing, given an objective function, the distribution, for each individual node pair, of the offered traffic load to the individual node pair among the routes which can realize communication between the nodes of the individual node pair, according to said given objective function, said optimizing step being performed with respect to route offered traffic values, wherein said step of optimizing the distribution comprises the steps of:
selecting initial route offered traffic values,
iteratively calculating, given said objective function, new route offered traffic values, ands
terminating said iteration process when at least one convergence condition is met, and wherein said step of apportioning is performed according to the finally calculated route offered traffic values, and apportioning, for each individual node pair, the offered traffic load of the individual node pair among the routes which can realize communication between the nodes of the individual node pair, according to the route offered traffic values after said optimization.

15. The method of claim 14, wherein the iteratively determining step comprises the steps of calculating a gradient of the objective function with respect to the route offered traffic values and using the gradient to obtain the new route offered traffic values in the iterative determination.

16. The method of claim 15, wherein the optimizing step is subject to physical constraints defining a feasibility region.

17. The method of claim 16, wherein the step of using the gradient of the objective function further comprises the steps of performing a one-dimensional line search to find an optimal step size in a direction of a projection of the gradient of the objective function to the feasibility region, and taking a step in the direction according to a found step size.

18. In a physical network comprising physical transmission and switching resources, a device for distributing offered traffic load among routes interconnecting the nodes of node pairs, comprising:

means for determining the optimal distribution, for each individual node pair in each one of a number of logical networks established on top of said physical network, of the traffic load offered to the individual node pair among the routes which can realize communication between the nodes of the individual node pair, according to a given objective function, said determining step being performed with respect to route offered traffic values, wherein said determining means further comprises:

means for selecting initial values for route offered traffic, means for iteratively calculating, given said objective function, new values for the route offered traffic by calculating the gradient of said given objective function with respect to the route offered traffic values and using said gradient to obtain said new values for the route offered traffic in said iteration process, and means for terminating said iteration process when at least one convergence condition is met, and wherein said apportioning means executes the apportioning in accordance with the finally calculated values for the route offered traffic, and means for apportioning, for each individual node pair in each one of said logical networks, the traffic load offered to the individual node pair among the routes which can realize communication between the nodes of the individual node pair, according to the route offered traffic values after said determination of the optimal distribution.

19. In a physical network comprising physical transmission and switching resources, a device for distributing offered traffic load among routes interconnecting the nodes of node pairs, comprising:

means for determining the optimal distribution, for each individual node pair in each one of a number of logical networks established on top of said physical network, of the traffic load offered to the individual node pair among the routes which can realize communication between the nodes of the individual node pair, according to a given objective function, said determining step being performed with respect to route offered traffic values, and means for apportioning, for each individual node pair in each one of said logical networks, the traffic load offered to the individual node pair among the routes which can realize communication between the nodes of the individual node pair, according to the route offered traffic values after said determination of the optimal distribution, wherein said apportioning means comprises random number generator means.

20. In a physical network, a method for partitioning physical link capacities among logical links, the method comprising the steps of:

establishing logical nodes and the logical links on top of the physical network, the logical links extending between the logical nodes;

selecting initial capacity values for the logical links;

iteratively determining, based on an objective function, new logical link capacity values, wherein the iterative determination is subject to physical constraints defining a feasibility region;

terminating the iterative determination when convergence with a known level of accuracy is obtained; and allocating the physical link capacities among the logical links according to the iteratively determined logical link capacity values;

wherein the iteratively determining step comprises the steps of calculating a gradient of the objective function with respect to the logical link capacities and using the gradient to obtain the new logical link capacity values in the iterative determination.

21. The method of claim 20, wherein the step of using the gradient of the objective function to obtain new logical link capacity values further comprises the steps of performing a one-dimensional line search to find an optimal step size in a direction of a projection of the gradient of the objective function to the feasibility region, and taking a step in the direction according to a found step size.

22. The method of claim 20, wherein the iterative determination is executed with physical network data, the topology of the logical links, routes and offered traffic to each route or to each node pair as input information, and each of said routes corresponds to a subset of logical links that interconnect the nodes of a node pair.

23. The method of claim 20, wherein the established logical links carry different traffic types, and the objective function comprises parameters that depend on the traffic types.

24. The method of claim 23, wherein the traffic types are distinguished with respect to bandwidth requirement.

25. The method of claim 20, wherein optimization is subject to physical link capacity constraints, and a logical link is guaranteed a minimum capacity provided overall physical link capacity constraints are satisfied.

26. In a physical network comprising physical switching resources and physical transmission resources, and carrying different traffic types, a method for partitioning the physical transmission resources among logical networks, comprising the steps of:

establishing the logical networks on top of the physical network, each logical network comprising a plurality of nodes and a plurality of logical links extending between the nodes, optimizing a given objective function, which is closely related to the operation of the physical network viewed as a set of the logical networks, with respect to decision variables comprising capacity values of the logical links, the objective function comprising variables that depend upon the traffic types, and allocating the physical transmission resources among the logical links of the logical networks according to the capacity values of said logical links after the optimization, whereby the operation of said physical network is optimized according to the given objective function and with consideration to the traffic types.

27. The method of claim 26, wherein said traffic types are distinguished with respect to a bandwidth requirement.

28. The method of claim 26, wherein the optimizing step and the allocating step are repeated in response to changing traffic conditions so as to adapt the partitioning of the physical transmission resources to prevailing traffic.

29. The method of claim 26, wherein the establishing step comprises the step of controlling a port assignment of the physical switching resources.

30. The method of claim 26, wherein the optimizing step comprises the steps of:
    selecting initial values for the capacity values of the logical links,
    iteratively calculating, given said objective function, new capacity values of logical links, and
    terminating said iteration process when at least one convergence condition is met; and
    wherein the allocating step is performed according to the finally calculated capacity values of the logical links.

31. The method of claim 30, wherein the optimizing step is subject to physical constraints defining a feasibility region.

32. The method of claim 31, wherein the step of iteratively calculating capacity values of the logical links comprises the steps of calculating a gradient of the given objective function with respect to the decision variables and using the gradient to obtain new capacity values of the logical links in the iterative calculation.

33. The method of claim 32, wherein the step of using the gradient of the given objective function to obtain new capacity values comprises the steps of performing a one-dimensional line search to find an optimal step size in a direction of a projection of the gradient of the objective function to the feasibility region, and taking a step in the direction according to a found step size.

34. The method of claim 32, wherein the step of calculating the gradient is based on a per se known reduced load and link independence assumption.

35. The method of claim 32, wherein the step of calculating the gradient includes the step of solving fixed point equations with respect to the current capacity values of the logical links.

36. The method of claim 30, wherein logical link capacity values obtained from a convex optimization method (COM) are selected as the initial values for the capacity values of the logical links.

37. The method of claim 26, wherein the allocating step comprises the step of using logical buffers at output ports of the physical switching resources.

38. The method of claim 26, wherein the physical network is an infrastructure network modeling the ATM cross connect stratum in a B-ISDN overlaid network.

39. The method of claim 26, wherein the optimizing step is executed with physical network data, the topology of the logical networks, traffic type information, the routes in each of the logical networks and the offered traffic to each route or to each node pair in each logical network as given input information, a route being defined as a subset of logical links which interconnect the nodes of a node pair within a given logical network.

40. The method of claim 26, wherein the objective function represents one of network resource utilization and total carried traffic summed up over all the logical networks.

41. In a physical network comprising physical transmission resources and carrying different traffic types, a device for partitioning the physical transmission resources among logical networks, comprising:
    means for establishing the logical networks on top of the physical network, each logical network comprising a plurality of nodes and a plurality of logical links extending between the nodes;
    means for optimizing a given objective function, which is representative of a performance of the physical network viewed as a set of the logical networks, with respect to decision variables comprising capacity values of said logical links, the objective function comprising variables that vary with traffic type, and
    means for allocating the physical transmission resources among the logical links of the logical networks according to the capacity values of the logical links after optimization.

42. In a physical network comprising physical transmission resources, and carrying different traffic types that are distinguished with respect to bandwidth requirement, a method for partitioning the physical transmission resources among logical networks, comprising the steps of:
    establishing the logical networks on top of the physical network, each logical network comprising a plurality of nodes and a plurality of logical links extending between the nodes, traffic types having a bandwidth requirement within a first interval being integrated in a first of the logical networks and traffic types having a bandwidth requirement within a second different interval being integrated in another of the logical networks;
    optimizing a given objective function, which is closely related to the operation of the physical network viewed as a set of the logical networks, with respect to decision variables comprising capacity values of the logical links, the objective function having bandwidth requirement variables that vary with traffic type; and
    allocating the physical transmission resources among the logical links of the logical networks according to the capacity values of said logical links after the optimization.

43. In a physical network, a method for partitioning physical link capacities among logical links, said method comprising the steps of:
    establishing logical nodes and the logical links on top of the physical network, the logical links extending between the logical nodes;
    selecting initial capacity values for the logical links,
    iteratively calculating, based on a given objective function, new logical link capacity values, wherein the iterative calculation is subject to physical constraints defining a feasibility region and involves establishing and solving of a set of fixed point equations;
    terminating the iterative calculation when convergence is achieved with a predetermined level of accuracy; and
    allocating the physical link capacities among the logical links according to the finally calculated logical link capacity values.

44. The method of claim 43, wherein the logical link capacity values are regarded as fixed in each iteration step, and the objective function, in each iteration step, is approximated as a linear function valid in a neighborhood of the fixed logical link capacity values.

45. The method of claim 43, wherein the fixed point equations are solved by successive substitutions to thereby compute blocking probabilities for the logical links.

* * * * *